(12) United States Patent
Gustafsson et al.

(10) Patent No.: US 6,597,672 B1
(45) Date of Patent: Jul. 22, 2003

(54) METHOD AND DEVICE IN A MOBILE TELECOMMUNICATIONS NETWORK

(75) Inventors: Bo Gustafsson, Borensberg (SE); Jan Hörnfeldt, Färentuna (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/248,665

(22) Filed: Feb. 11, 1999

(30) Foreign Application Priority Data

Feb. 12, 1998 (SE) ................................. 9800409

(51) Int. Cl.⁷ .................. H04Q 7/00; H04B 7/212
(52) U.S. Cl. ............... 370/329; 370/348; 370/443; 455/450
(58) Field of Search ................ 370/310, 321, 370/329, 331, 337, 338, 347, 348, 462, 459, 442, 443, 379; 455/450, 455, 452, 512

(56) References Cited

U.S. PATENT DOCUMENTS

| | | | | |
|---|---|---|---|---|
| 4,759,012 A | * | 7/1988 | Suzuki | 370/379 |
| 5,448,750 A | * | 9/1995 | Eriksson et al. | 455/452 |
| 5,729,541 A | * | 3/1998 | Hamalainen et al. | 370/348 |
| 5,752,193 A | * | 5/1998 | Scholefield et al. | 455/452 |
| 5,896,376 A | * | 4/1999 | Alperovich et al. | 370/348 |
| 6,031,832 A | * | 2/2000 | Turina | 370/348 |

FOREIGN PATENT DOCUMENTS

| | | | |
|---|---|---|---|
| EP | 0205055 | * | 12/1986 |
| EP | 0 205 055 | | 12/1986 |
| EP | 0 724 376 | | 7/1996 |
| WO | 94/05130 | | 3/1994 |
| WO | 96/10320 | | 4/1996 |
| WO | 99/17583 | | 4/1999 |
| WO | WO 99/17583 | * | 8/1999 |

OTHER PUBLICATIONS

Patent Abstracts of Japan, 10–136441, May 22, 1998.

\* cited by examiner

Primary Examiner—Alpus H. Hsu
Assistant Examiner—Afsar M. Qureshi

(57) ABSTRACT

In a mobile communication network, the chance of achieving multichannel connections is increased by determining if certain physical channels should be made idle to facilitate multi-channel connections and marking the channels that should be made idle. The marked channels may be moved actively, in which case the channels to which connections should be moved are selected, and the moving of connections to the selected channels is initiated. The marking and/or moving of the connection or connections is initiated, for example, when a predetermined number of attempts to allocate multichannel connections have failed, or when the network situation is such that the chance of establishing multichannels is low and should be increased, or when an establishment of multichannel connection is attempted unsuccessfully.

10 Claims, 4 Drawing Sheets

METHOD AND DEVICE IN A MOBILE TELECOMMUNICATIONS NETWORK

TECHNICAL FIELD

The present invention relates to the field of mobile communication between a base station and a mobile terminal, and in particular to connections with high transmission rates in a Time Division Multiplex Access (TDMA) system, such as the GSM system.

BACKGROUND

In a TDMA system, communication between the base station and a mobile terminal takes place in channels. A number of channels are transmitted on one carrier frequency using time division multiplex. The transmission on each carrier frequency takes place in time slots, and each physical channel occupies one time slot. As an example, in GSM, eight physical channels at a time may share the same carrier frequency, that is, eight time slots constitute one frame. One traffic channel (TCH) occupies one physical channel, and one connection usually involves one TCH. In this way, all connections are transferred at the same maximum bit rate. At present, the maximum bit rate is 14.4 kbit/s for payload information.

According to the GSM standard, frequency hopping may be used, that is, at regular intervals the carrier frequency is changed, to minimize the effects of multipath fading and the disturbances between the channels.

The standards High Speed Circuit Switched Data (HSCSD) and Global Packet Radio Services (GPRS) have been introduced in the GSM standard to enable connections with higher transmission rates. HSCSD and GPRS connections use a multislot configuration of channels for transmitting data, that is, one connection is allowed to occupy more than one channel, that is, more than one time slot in each flame. The network architecture to support HSCSD allows a maximum of eight independent full rate traffic channels to be used for one connection, to achieve a bit rate eight times higher than the normal bit rate.

Different mobile terminals are capable of handling different numbers of channels. The maximum number of uplink channels and downlink channels, respectively, and the total maximum number of channels may be restricted. In the GSM standard, 18 different mobile classes have been defined, specifying the number of channels that a mobile terminal is able to handle. Other restrictions are also specified; for example some mobile terminals can only handle consecutive channels in a multislot connection, whereas others can handle any combination of channels. The simplest mobile class only handles one uplink channel and one downlink channel. The most advanced mobile class handles up to eight channels in each direction, and any combination of channels may be used.

The GSM standard states that all channels to be allocated to one mobile connection in a multislot configuration must have the same Training Sequence Code (TSC), Hopping Sequence Number (HSN), Mobile Allocation (MA) and Mobile Allocation Index Offset (MAIO), if frequency hopping is used. If frequency hopping is not used, all channels used in the same multislot configuration must have the same TSC and Absolute Radio Frequency Channel (ARFCN). This means that all channels in a multislot configuration transmit and receive on the same frequencies in the same frame, with the same TSC, even when frequency hopping is used.

If the desired number of channels cannot be allocated to a connection, two different results are possible. Normally, transparent connections are refused, whereas non-transparent connections, for which there is no strict requirement for a certain data rate, are set up with the highest possible bandwidth. If a physical channel that may be used with the multislot connection becomes free, this physical channel may then be added to the multislot connection.

In most mobile telephony systems, channel spacing is used, that is, the uplink carrier frequency and the downlink frequency used in a connection are always at a specified distance from each other. When a carrier frequency has been selected for one direction, the carrier frequency to be used in the other direction is given. Thus, when high transmission rates are desired in both directions, it must be ensured that the desired number of channels are available on both the uplink and the downlink carrier frequencies.

If no such channels become free, the bandwidth of the connection will not be increased. Also, if a channel is released it may be occupied again by another connection before it is discovered and included in the multislot connection. The present solutions thus do not utilize the network resources in an optimal way. Allocation of channels may fail because bandwidth that is available may not be utilized.

Co-pending Swedish patent application 9703538-0 discloses a method of allocating channels to multislot connections in a mobile telecommunication network, in which all available channels into Multislot Resource Groups, each Multislot Resource Group comprising all channels that may be assigned to one multislot connection. When a multislot connection is to be established, the most suitable resource group is selected, as the resource group having a sufficient number of idle channels, but as few idle channels as possible above this number, and fulfilling a number of other requirements such as interference requirements.

This document only describes low to optimize the allocation of available resources in a current network situation. No solution is offered in the case when the requested number of channels cannot be allocated.

SUMMARY

It is an object of the present invention to increase the probability of achieving multislot connections having a desired bandwidth.

It is another object of the invention to increase the chance of utilizing neighbouring channels that are occupied when a multislot connection is set up and released during the connection.

It is yet another object of the invention to establish multislot connections having the desired bandwidth faster than what is possible with prior art methods.

It is another object to optimize the utilization of the capacity in the network.

These objects are achieved according to the present invention by a method in a mobile communication network of increasing the chance of achieving multichannel connections, comprising the following steps:
  determining if there is a need to make certain physical channels idle to facilitate multichannel connections,
  marking the channel or channels that should be made idle.
The marked channels may be moved actively, in which case the method also comprises the following steps:
  selecting the channels to which the connections on said marked channels should be moved,
  initiating the moving of said connections to said selected channels.

The marking and/or moving of the connection or connections is initiated, for example, when a predetermined number of attempts to allocate multichannel connections have failed, or when the network situation is such that the chance of establishing multichannels is low and should be increased. It may also be initiated when an establishment of a multichannel connection is attempted unsuccessfully, in which case the following steps are performed:

putting the multichannel connection on hold, moving the connections on the marked channels.

setting up the multichannel connection when sufficient bandwidth is available.

According to a preferred embodiment, the connections are moved using the intra-cell handover procedure.

If channels cannot be moved, the following steps may be performed:

setting up the multichannel connection with a lower bandwitdh than requested, waiting until the marked channels become idle, including the marked channels in the multichannel connection.

A control unit in a mobile communications network is also described, said unit comprising:

means for determining if there is a need to make certain physical channels idle to facilitate multichannel connections, means for marking the channel or channels that should be made idle.

The control unit may also comprise means for selecting a channel or channels to which connections may be moved and means for initiating the moving of a connection on a marked physical channel to a selected physical channel.

The invention offers the following advantages:

The probability of success in achieving high transmission rates for multislot channel allocations is increased compared to the prior art solutions.

It allows a more effective use of the capacity when multislot connections are used.

According to the invention, only the desired bandwidth of the connection is taken into account. Generally a number of parameters have to be considered when setting up a connection, including the properties of the mobile terminal. The above mentioned co-pending Swedish patent application 9703538-0 discloses a method for allocating multislot channels according to several of these parameters.

DETAILED DESCRIPTION

Figure 1:
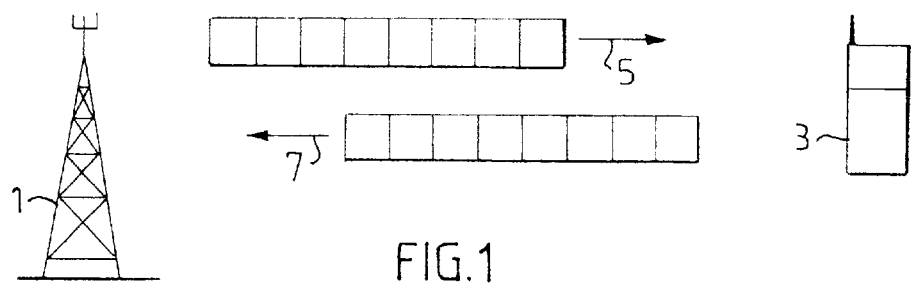
FIG. 1 shows the signalling principle between a base station and a mobile terminal according to TDMA.

FIG. 1 shows the transmission between a base station 1 and a mobile terminal 3 in a mobile telephone network. A number of channels, usually eight, share the same carrier frequency by means of time division multiplexing.

The transmission direction from the base station 1 to the mobile terminal 3 is referred to as the downlink, or forward, direction and is indicated by an arrow 5. The transmission direction from the mobile terminal 3 to the base station 1 is referred to as the uplink, or reverse, direction and is indicated by an arrow 7.

Normally, different frequency bands are used for downlink and uplink transmission. This is referred to as Frequency Division Duplex (FDD). Time Division Duplex (TDD), in which the same frequencies are used in both directions but at different times, is rarely used.

Figure 2:
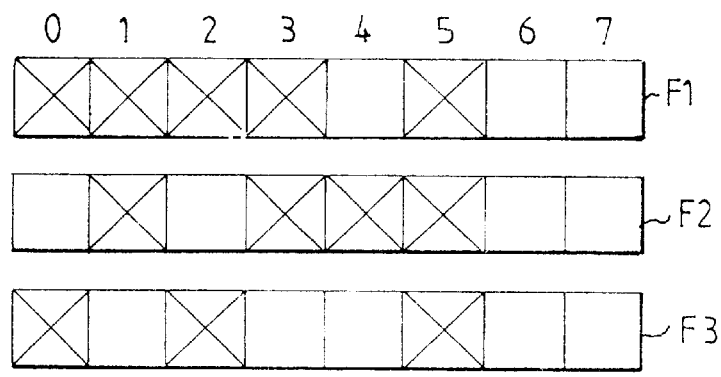
FIG. 2 illustrates the problem of establishing a multichannel connection.

FIG. 2 illustrates, by way of an example, the problem solved by the present invention.

Three frames F1, F2, and F3 are shown, each comprising eight time slots, numbered from 0 to 7. In the first frame F1, time slots 0, 1, 2, 3 and 5 are occupied. In the second frame F2, time slots 1, 3, 4 and 5 are occupied. In the third frame F3, time slots 0, 2 and 5 are occupied. If there is a request for a multichannel connection of three or more channels, none of the frames F1, F2, F3 will be able to provide this connection, although each frame F1, F2, F3 has at least three idle channels.

The maximum number of consecutive idle channels is referred to as $\Delta 1$. The maximum number of consecutive idle channels that may be obtained by moving one connection to another channel is referred to as $\Delta 2$. As shown in the FIG., the maximum number of consecutive idle channels in the first frame F1 is two, channels 6 and 7, that is $\Delta 1=2$. By moving the connection on channel 5 in the first frame F1 to another channel, a maximum of four consecutive idle channels may be obtained, that is, $\Delta 2=4$.

The maximum number of consecutive idle channels in the third frame F3 is two, channels 3 and 4, and channels 6 and 7, respectively. By moving the connection on channel 5 in the third frame F3 to another channel, a maximum of five consecutive idle channels may be obtained, that is, $\Delta 2=5$.

Figure 3:
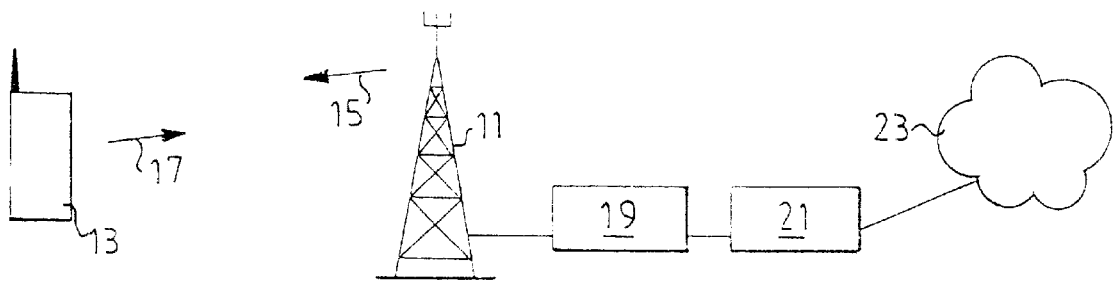
FIG. 3 shows the basic building blocks of a mobile telephony network.

FIG. 3 shows the basic building blocks of a mobile telecommunication network. As in FIG. 1, there is a base station 11 communicating with a mobile terminal 13. The downlink direction is indicated by an arrow 15 and the uplink direction is indicated by an arrow 17. The base station 11 is connected to a Base Station Controller (BSC) 19, which primarily controls the radio network. Its most important task is to ensure the efficient use of the resources in the mobile network. Several base stations may be connected to one BSC.

The BSC 19 is connected to a Mobile Switching Centre (MSC) 21, which performs all switching functions related to call processing in the mobile network. The MSC 21 is typically connected to a Public Services Telephone Network (PSTN) 23, and to other telecommunication networks, as common in the art.

The BSC performs, among other things, the following functions:

Allocation of network resources, such as radio channels,

Administration of system information data and locating data

Traffic and event measurements, such as measurements of the number of call attempts, congestion, number of handovers, etc.

As will be obvious to the skilled person, these functions may be implemented in different ways, and not necessarily in the same unit. Also, the BSC and the MSC functions may be implemented in one unit. The functions important to this invention are primarily the resource allocation functions.

Signalling in GSM Systems

In a TDMA system, each carrier frequency is divided into a number of time slots. In this example, as shown in FIG. 1, there are eight time slots, TS0, TS1, ..., TS7. These eight time slots make up one TDMA frame, as shown in FIG. 1., 26 or 51 frames make up one multiframe. The same time slot in a sequence of frames, e.g. time slot 0 in all the frames, is referred to as a physical channel.

One physical channel may be used, at different times, for transmission of different logical channels. Logical channels may be either traffic channels carrying, payload or control channels carrying different kinds of control information. One telephone call normally uses one physical channel for transmission in each direction for the duration of the connection. In HSCSD and GPRS, one connection may use more than one physical channel.

Criteria for Moving Connections

According to a first preferred embodiment of the invention, one or more connections may be moved to other channels when there is a need for it, that is when there is a request for a multislot connection that cannot be given sufficient bandwidth in the current network situation. Typically, in such a situation, the highest number of idle consecutive channels will be selected, and the adjacent channel or channels will be selected. According to a preferred embodiment, the connections on the selected channels are then moved, using the intra-cell handover procedure known in the art. According to another embodiment, the multislot connection will be set up with a lower bandwidth than requested. When the selected channels become idle, they may be used for increasing the bandwidth of the multislot connection.

Figure 4:
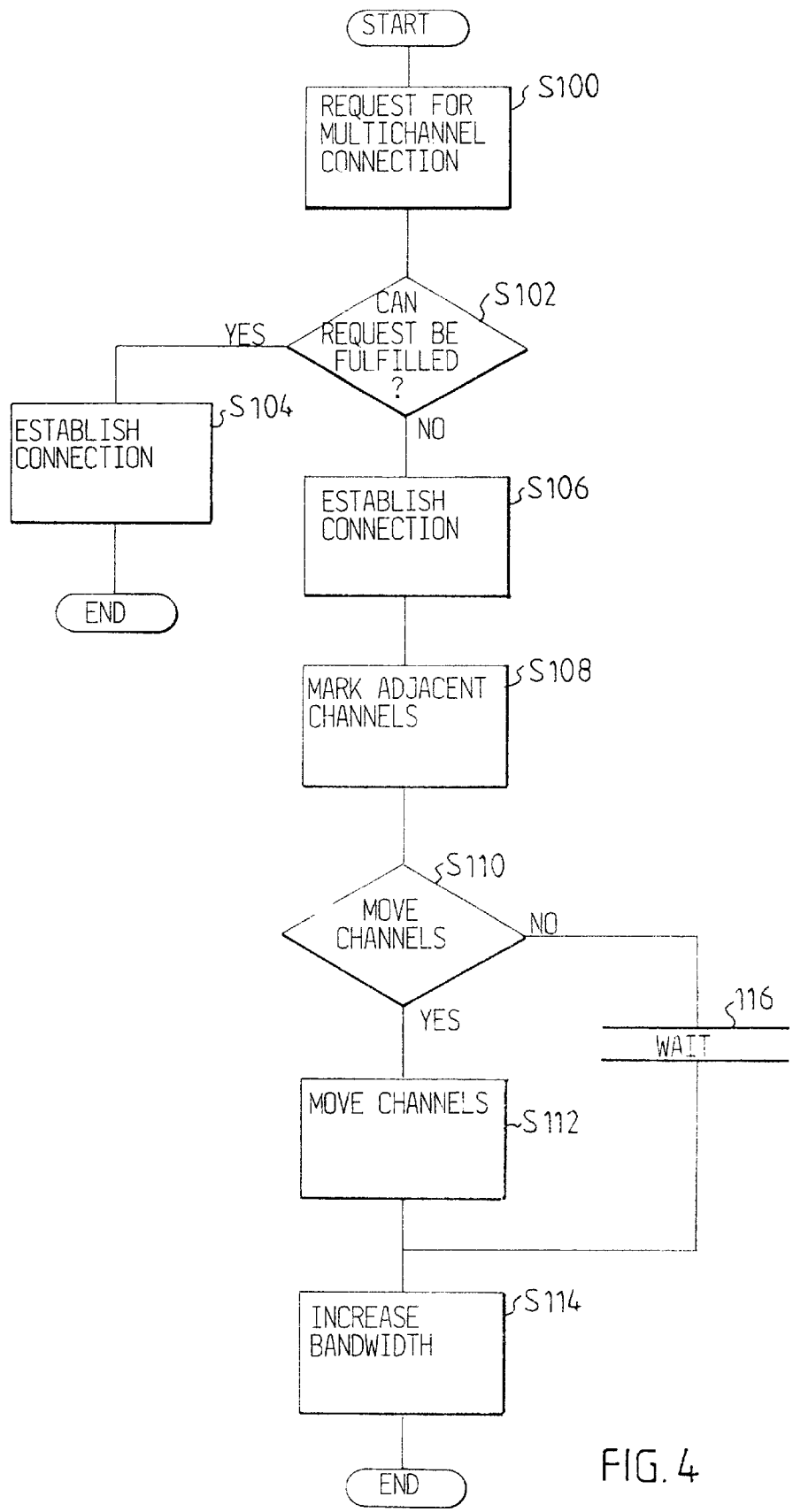
FIG. 4 is a flow chart of the actions carried out when moving connections according to a first preferred embodiment of the invention.

FIG. 4 is a flow chart of the actions carried out when moving connections according to the first preferred embodiment of the invention.

Step S100: A multichannel connection is requested

Step S102: Can the request be fulfilled? If yes, go to step S104; if no, go to step S106.

Step S104: Establish the connection as requested. End of procedure.

Step S106: Establish the connection with lower bandwidth than requested.

Step S108: Mark occupied channels adjacent to the channels used in the multichannel connection, so that they will not be used in other connections when they become idle.

Step 110: Should connections be moved? If yes, go to step S112; if no, go to step S116.

Step S112: Move the connections on the marked channels to other channels. This may be done, for example, according to the intra-cell handover procedure.

Step S114: Use the idle channel or channels to increase the bandwidth of the multichannel connection. End of procedure.

Step S116: Wait until one or more of the marked channels become idle. Go to step S114.

This embodiment will only work for non-transparent connections. A modification that would also work for transparent connections would be to put the connection on hold until sufficient bandwidth had been made available, then set up the connection.

Figure 5:
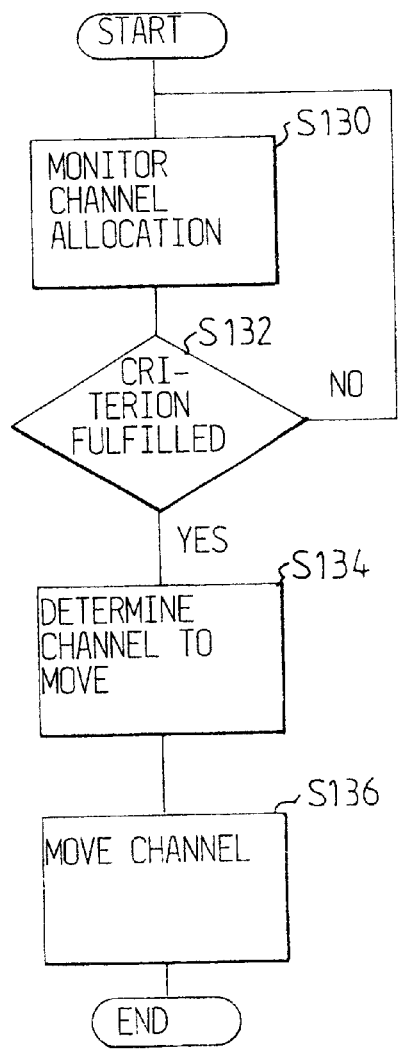
FIG. 5 is a flow chart of the actions carried out when moving connections according to a second preferred embodiment of the invention.

FIG. 5 is a flow chart of the actions carried out when moving connections according to a second preferred embodiment of the invention. According to this embodiment, one or more criteria have been set for when connections should be moved.

Step S130: Monitor the configuration of allocated channels.

Step S132: Has the criterion been fulfilled? If yes, go to step S134; if no, go to step S132.

Step S134: Determine the connection or connections to move.

Step S136: Move the connections according to the intra-cell handover procedure.

According to this embodiment, the criterion for moving one or more connections may be that the number of sequences of, for example, three or four consecutive idle channels is below a certain threshold. In this situation, the chances of successfully establishing multislot connections of a certain bandwidth, corresponding to the number of consecutive idle channels, is decreased.

Another criterion for moving one or more connections may be that the fragmenting ratio is too high, for example calculated as the total number of idle channels divided by the maximum number of consecutive idle channels in the network. Connections may be moved when one, or a predetermined number of allocation attempts have failed, or, as mentioned before, when a multichannel connection is waiting for sufficient subsequent bandwidth.

Figure 6:
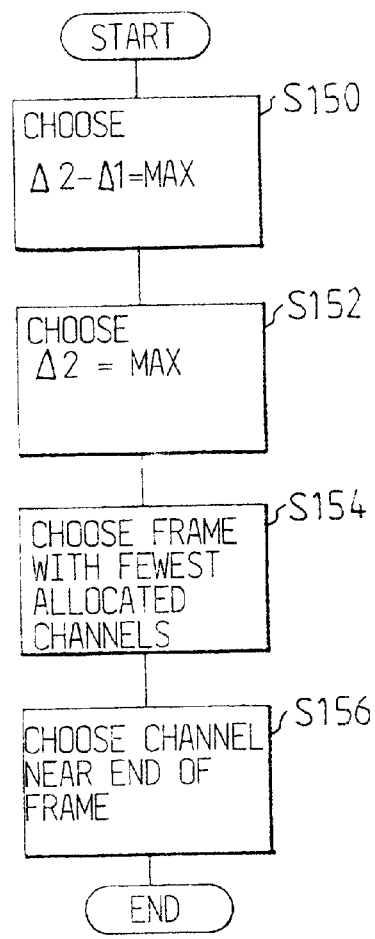
FIG. 6 is a flow chart showing an algorithm for selecting connections to be moved.

FIG. 6 shows an algorithm for selecting what connection is to be moved. The discussion of this flowchart should be taken in connection with FIG. 2.

Step S150: Select the channels for which $\Delta 2-\Delta 1$ is maximized, that is, the channels for which the increase in consecutive bandwidth is the largest Step S152: Among the channels selected in step S150, select the channels for which $\Delta 2$ is maximized, that is, that channels that, if made idle, will maximize the consecutive bandwidth.

Step S154: Among the channels selected in step S152, select the channels from the multislot frames in which the smallest number of channels are occupied.

Step S156: Among the channels selected in step 154, select the channel farthest away from the multislot frame border. End of procedure.

Allocating Channels

Figure 7:
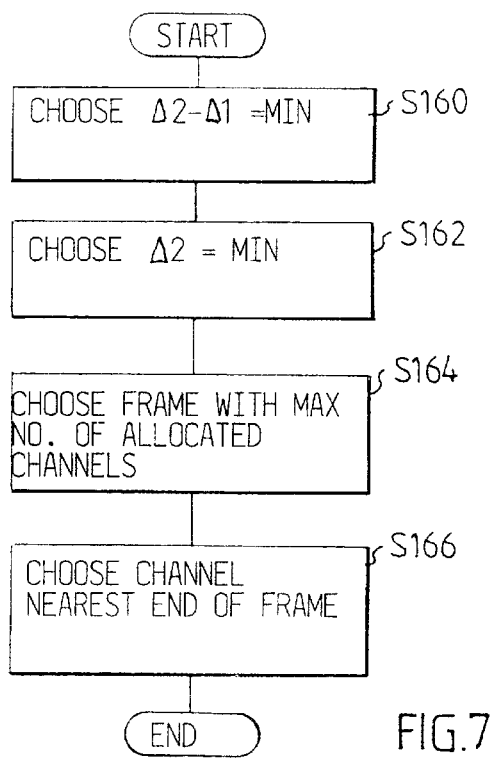
FIG. 7 is a flow chart showing an algorithm for selecting the channels to allocate to connections.

FIG. 7 is a flow chart of an algorithm for selecting channels to which the moved connections should be allocated, according to a preferred embodiment of the invention. The same algorithm may of course be used when allocating channels to new connections, to maximize the chances of successfully establishing subsequent multislot connections.

Step S160: Select the channel or channels for which $\Delta 2-\Delta 1$ is minimized, that is, the channels for which the decrease in consecutive bandwidth is smallest.

Step S162: Among the channels selected in step 160, select the channel or channels for which $\Delta 2$ is minimized, that is, the remaining channels for which the remaining consecutive bandwidth will be maximized. In this way the maximum number of consecutive channels is kept in the other frames.

Step S164: Among the channels selected in step 162, select the channel or channels from the multislot frames in which the highest number of channels are occupied.

Step S166: Among the channels selected in step 164, select the channel closest to the multislot frame border. End of procedure.

As will be obvious to the skilled person, the steps S150–S156 and S160–S166 may be performed in a different order. In particular, the order of the steps S152 and S154 and steps S162 and S164, respectively, may be changed. Changing the order of the steps will in some cases produce a different result.

Figure 8A:
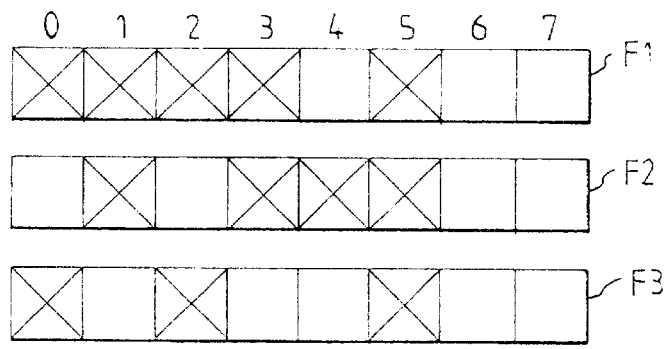
FIGS. 8A and 8B show the moving of connections according to an embodiment of the invention.
Figure 8B:
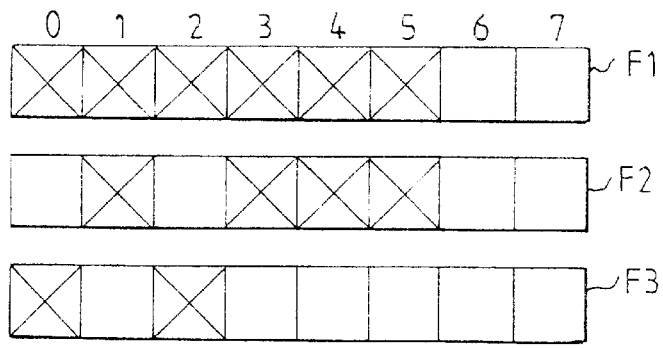

FIGS. 8A and 8B illustrate the application of the procedures shown in FIGS. 6 and 7 on the same three frames shown in FIG. 2.

The same three frames F1, F2, and F3 are shown, each comprising eight time slots, numbered from 0 to 7.

In FIG. 8A, the same situation as in FIG. 2 is shown, that is, the first frame F1, time slots 0, 1, 2, 3 and 5 are occupied. In the second frame F2, time slots 1, 3, 4 and 5 are occupied. In the third frame F3, time slots 0, 2 and 5 are occupied. If there is a request for a multichannel connection of three or more channels, none of the frames F1, F2, F3 will be able to provide this connection, although each frame F1, F2, F3 has at least three idle channels.

According to the invention, a three-channel connection could be set up in any of the three frames, by moving one connection only. By moving the connection on channel 5 in the first frame F1, a four channel connection could be set up in this frame F1.

If the algorithm shown in FIG. 6 is used, it becomes obvious that the one channel that should be made idle to make the highest bandwidth available is channel 5 of the third frame F3. Using the algorithm of FIG. 7 shows that the best channel to move this connection to is channel four of the first frame F1. The situation after this move is shown in FIG. 8B. In the first frame F1, six consecutive channels are occupied and two consecutive channels are idle. In the second frame F2, the situation is as before, and in the third frame, five consecutive channels are now idle.

Moving Connections

In a GSM system, connections may be moved using the procedure for intra-cell handover known in the arm. According to this procedure, a connection may be moved from one physical channel to another physical channel, without moving the radio connection to another cell.

In this case, the BSC or an equivalent unit in the network, must be provided with the following:
means for monitoring the channel allocation, to determine if the allocated channels fulfil the criteria for moving connections
means for determining what connections are to be moved and to which channels,
means for initiating the moving of connections to new channels,
knowledge about the properties of the channels,
knowledge about the properties of the terminal.

What is claimed is:

1. A method in a mobile communication network for establishing a multichannel connection, wherein a multichannel connection utilizes two or more adjacent physical channels in time-division multiplex frames having a plurality of physical channels, comprising the following steps:
   determining if there is a need to make one or more active physical channels idle to facilitate said multichannel connection;
   marking said one or more active physical channels that should be made idle, wherein said step of marking comprises selecting the channel or channels from which the connection should be moved by carrying out the following steps in arbitrary order i) selecting the channels for which the increase in consecutive bandwidth will be maximized; ii) selecting the channels for which the consecutive bandwidth is maximized; iii) selecting the channels from the frames in which the smallest number of channels are occupied; and iv) selecting the channel farthest away from the frame border; and
   reassigning said marked physical channels to said multichannel connection.

2. A method according to claim 1, further comprising the following steps
   selecting the channels to which the connections on said marked channels should be moved,
   initiating the moving of said connections to said selected channels.

3. A method according to claim 1, wherein the marking and/or moving of the connection or connections is initiated when a predetermined number of attempts to allocate multichannel connections have failed.

4. A method according to claim 1, wherein the marking and/or moving of the connection or connections is initiated when the network situation is such that the chance of establishing multichannels is low and should be increased.

5. A method according to claim 1, wherein the marking of the channel or channels that should be made idle is initiated when an establishment of a multichannel connection is attempted unsuccessfully, the method further comprising the steps of
   putting the multichannel connection on hold,
   moving the connections on the marked channels,
   setting up the multichannel connection when sufficient bandwidth is available.

6. A method according to claim 1, wherein the connections are moved using the intra-cell handover procedure.

7. A method according to claim 1, wherein the marking of the channel or channels that should be made idle is initiated when an establishment of a multichannel connection is attempted unsuccessfully, the method further comprising the steps of
   setting up the multichannel connection with a lower bandwidth than requested,
   waiting until the marked channels become idle,
   including the marked channels in the multichannel connection.

8. A method of allocating connections to physical channels, in time-division multiplex frames having a plurality of physical channels, comprising the following steps, in an arbitrary order:
   selecting the channels for which the decrease in consecutive bandwidth is smallest,
   selecting the channel or channels for which the remaining consecutive bandwidth will be maximized,
   selecting the channel or channels from the frames in which the highest number of channels are occupied,
   selecting the channel closest to the frame border.

9. A control unit in a mobile communications network for establishing a multichannel connection, wherein a multichannel connection utilizes two or more adjacent physical channels in time-division multiplex frames having a plurality of physical channels, comprising:
   means for determining if there is a need to make one or more active physical channels idle to facilitate said multichannel connection;
   means for marking said one or more active physical channels that should be made idle, wherein said means for marking comprises means for selecting the channel or channels from which the connection should be moved by carrying out the following steps in arbitrary order: i) selecting the channels for which the increase in consecutive bandwidth will be maximized; ii) selecting the channels for which the consecutive bandwidth is maximized; iii) selecting the channels from the frames in which the smallest number of channels are occupied; and iv) selecting the channel farthest away from the frame border; and reassigning said marked physical channels to said multi-channel connection.

10. A control unit according to claim 9, further comprising means for selecting a channel or channels to which connections may be moved and means for initiating the moving of a connection on a marked physical channel to a selected physical channel.

* * * * *